United States Patent [19]

Gauthier et al.

[11] 3,775,896
[45] Dec. 4, 1973

[54] ANIMAL TRAPS

[76] Inventors: Joseph Aldege Gauthier; Louis Marcel Shank, both of R.R. 2, Sturgeon Falls, Ontario, Canada

[22] Filed: June 14, 1972

[21] Appl. No.: 262,459

[52] U.S. Cl. .................................................. 43/81
[51] Int. Cl. ................................................ A01m 23/30
[58] Field of Search .................................... 43/81

[56] References Cited
UNITED STATES PATENTS

| | | | |
|---|---|---|---|
| 352,800 | 11/1886 | Becker | 43/81 |
| 968,990 | 8/1910 | Schuyler | 43/81 |
| 1,340,442 | 5/1920 | Gilmore | 43/81 |
| 1,557,847 | 10/1925 | Kerr | 43/81 |
| 3,100,361 | 8/1963 | Wanless et al. | 43/81 |

*Primary Examiner*—Louis G. Mancene
*Assistant Examiner*—Daniel J. Leach
*Attorney*—W. Britton Moore

[57] ABSTRACT

An animal trap of simple but sturdy construction having an elongated rigid spine to which a ground-engaging frame formed of strip material is secured. A movable frame of strip material is pivoted to the ground-engaging frame for pivotal movement between an upwardly extending open position and a forwardly extending closed position in which an undersurface of a cross-head of said movable frame abuts a top surface of a longitudinal section of said ground-engaging frame. At least one helically wound spring having tangentially extending arms terminating in loops is provided for urging the trap into its closed disposition. Both the loops encircle a side arm of the ground-engaging frame, while one abuts the spine and the other is urged by the spring against a side arm of the movable frame. A bait-holding frame pivotally mounted on the spine has a length less than that of the movable frame and includes an elongated member adapted releasably to engage the inner end of a retaining arm pivotally mounted on the cross-head of the movable frame so that, on movement of the bait-holding frame, the retaining arm is released in turn to allow the spring to force the trap into its closed disposition.

9 Claims, 2 Drawing Figures

PATENTED DEC 4 1973

3,775,896

ANIMAL TRAPS

BACKGROUND OF THE INVENTION

The present invention relates to animal traps and more particularly to improved traps especially suited to the trapping of medium-sized animals such as beavers, otters, raccoons, wolves, etc.

Although numerous animal traps have heretofore been proposed, many of the previously known traps have presented certain practical disadvantages. For instance, some such traps have been relatively expensive to manufacture while others have proved to be somewhat unreliable or inhumane in their operation and use.

It is a primary object of the present invention to provide a trap which is especially simple in its construction yet highly effective in its operation giving particularly high operating speed and impact.

It is yet another object of the present invention to provide a trap which has a robust construction and which can consequently be used repeatedly without fear of malfunction.

Another object of the invention is to provide an animal trap which can be manufactured relatively inexpensively.

SUMMARY OF THE INVENTION

These and other objects are achieved in accordance with the invention by the provision of an animal trap comprising a rigid elongated spine, a ground-engaging frame including side arms rigidly secured to said spine and extending forwardly therefrom and a longitudinal section having a top surface and interconnecting said side arms forwardly of said spine, a movable frame including side arms and pivotally mounted on said ground-engaging frame about pivot points forwardly disposed with respect to said spine and a cross-head having an undersurface and interconnecting said side arms of said movable frame for movement of said movable frame between a closed portion in which said movable frame extends generally forwardly from said pivot points on said ground-engaging frame with said undersurface of said cross-head abutting said top surface of said longitudinal section of said ground-engaging frame and an open position in which said movable frame extends generally upwardly from said pivot points on said ground-engaging frame, spring means comprising at least one helically wound spring with two generally tangentially extending arms resiliently urged apart by said helically wound spring, each of said tangentially extending arms terminating in a loop, one of which encircles and is slidably disposed about one said side arm of said ground-engaging frame intermediate said spine and one of said pivot points for abutting engagement with said spine and the other of which encompasses and is slidingly disposed about a side arm of said ground-engaging frame for abutting engagement with said movable frame and for encircling both said side arms of said ground-engaging frame and an adjacent side arm of said movable frame by free forward movement along said side arm of said ground-engaging frame past said one of said pivot points when said movable frame moves into its closed position, whereby said spring means serves to urge said movable frame into its closed position, a bait-holding device having a length less than that of said movable frame and including an elongated member pivotally mounted on said spine for rotational movement about a pivot axis generally parallel to said spine and upwardly thereof, and a retaining arm having an outer end pivotally connected to said cross-head of said movable frame, an inner end adapted releasably to engage said elongated member of said bait-holding device to hold said movable frame releasably in said open position and a length such that said inner end can engage said elongated member of said bait-holding device only when said movable frame is in its open position, said inner end of said retaining arm having such a configuration that it is released from engagement with said elongated member of said bait-holding device when said bait-holding device is rotated about said pivot axis of said elongated member thereof, whereby said movable frame is consequently moved into its closed position under the influence of said spring means.

A particularly important feature of a trap in accordance with the present invention resides in the aforementioned pivotal mounting for the bait-holding device upwardly of the elongated spine. In accordance with a preferred feature of the invention, both the movable frame and the ground-engaging frame are formed from elongated upright strip material and the side arms of the movable frame are formed so that they first extend forwardly along respective side arms of the ground-engaging frame when said movable frame is in its closed position and then forwardly and angularly upwardly relative to said side arms of said ground-engaging frame.

A trap according to the invention may be provided with one or two of the aforementioned spring means according to the closing force which is required to be applied to the movable frame of the trap.

Other objects, features and advantages of the invention will become apparent as the description proceeds.

BRIEF DESCRIPTION OF THE DRAWINGS

The invention will now be described merely by way of illustration with reference to the accompanying drawings in which.

DESCRIPTION OF THE PREFERRED EMBODIMENT

Figure 1:
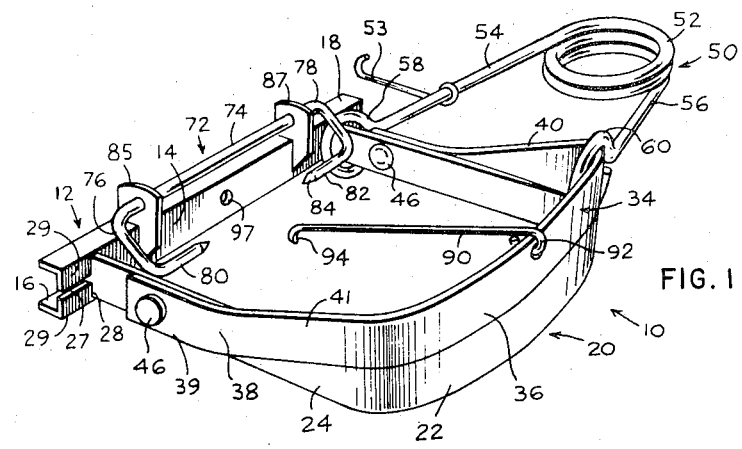
FIG. 1 is a perspective view of a particularly useful embodiment of an animal trap according to the invention showing the movable frame thereof held in its closed position.
Figure 2:
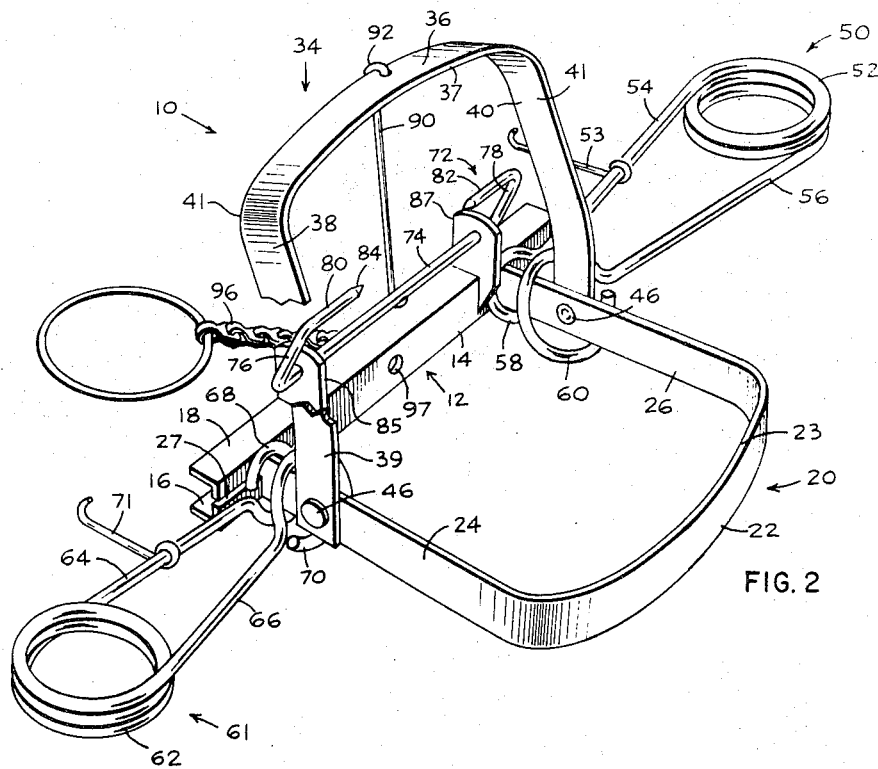
FIG. 2 is a perspective view similar to that of FIG. 1 but showing the trap held in its open position by the engagement of its retaining arm with the elongated member of the bait-holding frame thereof and showing the provision of two instead of the one spring means of FIG. 1 to make it clear that the provision of one or two such spring means is possible in accordance with the invention.

The animal trap indicated generally at 10 in FIGS. 1 and 2 comprises an elongated spine generally indicated at 12 and formed as a length of generally U-shaped metal angle having a lower ground-engaging flange 16, an upper flange 18 and an intermediate web 14. The trap also comprises a ground-engaging frame generally indicated at 20 and formed from an upright metal strip bent so as to have side sections or arms 24 and 26 and a longitudinal section 22, the section 22 having a forwardly directed curved convex configuration. The rearward free ends of the side arms 24 and 26 are rigidly secured to the spine 12 by insertion into cut-away end sections 27 provided for this purpose in the web 14 of the spine 12. The side arms 24 and 26 are formed with notches 28 to receive the edges of the web 14 and the finger-like end projections 29 of the spine 12 may be deformed inwardly towards each other to provide a positive locking of the ground-engaging frame 20 to the spine 12.

A movable frame, generally indicated at 34, is pivotally mounted in a manner yet to be described on the side arms 24 and 26 of the ground-engaging frame 20. In the embodiment illustrated, the movable frame 34 is formed from an upright metal strip bent so as to have a longitudinal section or cross-head 36 and two side sections or arms 38 and 40. At their free ends, the side arms 38 and 40 are pivotally mounted by rivets 46 on the side arms 24 and 26 respectively of the ground-engaging frame 20. It will be seen that the cross-head 36 of the movable frame 34 also has a forwardly directed curved convex configuration.

The pivotal mounting of the movable frame 34 on the ground-engaging frame 20 permits the movable frame 34 to move between the closed position shown in FIG. 1 and the open position of FIG. 2 in which the movable frame 34 extends generally upwardly from the pivot points constituted by the aforementioned rivets 46. The movable frame 34 is shaped so that, when that frame is in its closed position as shown in FIG. 1, the side arms 38 and 40 thereof first extend along respective ones of the side arms 24 and 26 of the ground-engaging frame 20 as indicated at 39 and then forwardly and angularly upwardly therefrom as indicated at 41. In this way, when the movable frame 34 is in its closed position, the undersurface 37 of the cross-head 36 of that frame abuts the top edge 23 of the longitudinal section 22 of the ground-engaging frame 20. The side arms 38 and 40 of the movable frame 34 are also closely disposed to the side arms 24 and 26 respectively of the ground-engaging frame 20 when the trap is in its closed disposition as shown in FIG. 1.

The spring means generally indicated at 50 in FIGS. 1 and 2 is another essential component of the trap 10. It will be seen that the spring means 50 comprises a generally helically wound spring 52 with two generally tangentially extending arms 54 and 56 resiliently urged apart by the spring 52. These arms 54 and 56 terminate in loops 58 and 60 respectively which encircle the side arm 26 of the ground-engaging frame 20. The loop 58 on the arm 54 is disposed intermediate the spine 12 and the pivot point formed by the rivet 46 for the side arm 40. The loop 60 is sufficiently large to encircle both the side arm 26 of the ground-engaging frame 20 and the side arm 40 of the movable frame 34 at all positions therealong when the latter frame is in its closed position as will be understood by reference to FIG. 1.

In use, the loop 58 is provided for abutting engagement with the spine 12 while the loop 60 is provided for abutting engagement with the side arm 40 of the movable frame 34 so that spring 52 serves to urge the movable frame 34 from its open position as shown in FIG. 2 into its closed position as shown in FIG. 1. A hook 53 pivotally surrounding arm 54 is provided for temporarily locking the arms 54 and 56 together during the setting of the trap in a manner which will be well known to those conversant with the use of similar traps.

As hereinbefore indicated, a trap according to the present invention may be provided with one or two spring means, such as spring means 50. It is for this reason that, while the trap is shown in FIG. 2 as having a second spring means, indicated generally at 61 the latter spring is omitted from FIG. 1. Since the structure of spring means 61 is identical to that of spring means 50, its structure will not be described herein in detail. It will be sufficient to explain that it comprises a helically wound spring 62 having tangentially extending arms 64 and 66 which terminate respectively in loops 68 and 70 which encircle the side arm 24 of the ground-engaging frame 20. The spring means 61 is provided with a temporary locking hook 71.

Another important structural component of the trap 10 shown in the drawings is the bait-holding device generally indicated at 72 and which, in the embodiment illustrated, has the form of an open frame made up of an elongated member 74, side sections 76 and 78 and inwardly extending prongs 80 and 82 having pointed ends 84. The elongated member 74 is pivotally mounted on the spine 12 for rotation about an axis generally parallel thereto in upwardly extending plates 85 and 87 rigidly secured, for example, by welding, to the upper flange 18 and the web 14 of the spine 12. It is to be noted that the bait-holding frame 72 has a shorter length than the movable frame 34 and that it can be pivoted between a first position (as shown in FIG. 2) and a second position angularly forwardly disposed with respect to said first position (as shown in FIG. 1).

A retaining arm 90 is pivotally mounted on the cross-head 36 of the movable frame 34 by means of a loop 92 at its upper end extending through an opening in that cross-head. The arm 90 is provided at its lower end with a forwardly curved end portion 94 for releasable engagement with the elongated member 74 of the bait-holding frame 72 as shown in FIG. 2. It will be seen from the accompanying drawings that, with the trap in its open or "set" position as illustrated in FIG. 2, the end portion 94 of the retaining arm 90 extends downwardly behind and then partially forwardly beneath the elongated member 74 of the bait-holding frame 72. Normally, the inner end 94 of the retaining arm 90 will be bent through an angle of approximately 90°. It will also be understood that the length of the retaining arm 90 will be such that the inner end 94 thereof is correctly positioned relative to the elongated member 74 when the trap is set in its open position as shown in FIG. 2.

In use, appropriate bait material is first firmly secured between the prongs 80 and 82 and the bait-holding frame 72 is then pivoted to the position shown in FIG. 2. The movable frame 34 is then raised against the action of spring means 50, and spring means 61 (if provided), until the curved end portion 94 at the lower end of the retaining arm 90 can be slid under the elongated member 74 of the bait-holding frame 72 to hold the trap in its open disposition as shown in FIG. 2.

If desired, the spring means 50 and 61 can be locked in these "set" positions using temporary locking hooks 53 and 71 respectively until the trap has been placed in its final position on the ground.

In its attempts to remove the bait from the trap, an animal will cause the bait-holding frame 72 to pivot forwardly from the position shown in FIG. 2 to that shown in FIG. 1. Such movement of the bait-holding frame 72 causes the curved end portion 94 of the retaining arm 90 to be released by the elongated member 74. The spring means 50 and spring means 61 (if provided) then urge the movable frame 34 rapidly and strongly downwardly and forwardly to trap the animal thereunder.

In order to reduce the risk of removal of the trap by an injured animal, it will of course be customary to secure the trap to a stump or to anchor it by means of chains or wires. Such a chain is shown at 96 in FIG. 2, the chain 96 being secured to the spine 12, for example, through an opening 97 therein.

Since the trap 10 is effective only if the animal is situated forwardly of the spine 12, i.e. over the ground-engaging frame 20, the trap will normally be used in such a way that the animal is compelled to approach the bait from the forward side of the trap. This can be ensured by placing the spine of the trap against a rock or other small land rise or even by tying or otherwise securing the trap to the base of a suitable tree.

The embodiments of the invention in which an exclusive property or privilege is claimed are defined as follows:

1. An animal trap comprising a rigid elongated spine, a ground-engaging frame including side arms rigidly secured to said spine and extending forwardly therefrom and a longitudinal section having a top surface and interconnecting said side arms forwardly of said spine, a movable frame including side arms pivotally mounted on said ground-engaging frame about pivot points forwardly disposed with respect to said spine and a cross-head having an undersurface and interconnecting said side arms of said movable frame for movement of said movable frame between a closed position in which said movable frame extends generally forwardly from said pivot points on said ground-engaging member with said undersurface of said cross-head abutting said top surface of said longitudinal section of said ground-engaging frame and an open position in which said movable frame extends generally upwardly from said pivot points on said ground-engaging frame, spring means comprising at least one helically wound spring with two generally tangentially extending arms resiliently urged apart by said helically wound spring, each of said tangentially extending arms terminating in a loop, one of which encircles and is slidably disposed about one said side arm of said ground-engaging frame intermediate said spine and one of said pivot points for abutting engagement with said spine and the other of which encompasses and is slidingly disposed about a side arm of said ground-engaging frame for abutting engagement with said movable frame and for encircling both said side arm of said ground-engaging frame and an adjacent side arm of said movable frame by free forward movement along said side arm of said ground-engaging frame past said one of said pivot points when said movable frame moves into its closed position, whereby said spring means serves to urge said movable frame into its closed position, a bait-holding device having a length less than that of said cross-head of said movable frame and including an elongated member pivotally mounted on said spine for rotational movement about a pivot axis generally parallel to said spine and upwardly thereof and a retaining arm having an outer end pivotally connected to said cross-head of said movable frame, an inner end adapted releasably to engage said elongated member of said bait-holding device to hold said movable frame releasably in said open position and a length such that said inner end can engage said elongated member of said bait-holding device only when said movable frame is in its open position, said inner end of said retaining arm having such a configuration that it is released from engagement with said elongated member of said bait-holding device when said bait-holding device is rotated about said pivot axis of said elongated member thereof, whereby said movable frame is consequently moved into its closed position under the influence of said spring means.

2. An animal trap as claimed in claim 1 in which said inner end of said retaining arm is adapted to extend downwardly behind and then partially forwardly beneath said elongated member of said bait-holding device releasably to retain said movable frame in said open position thereof.

3. An animal trap as claimed in claim 2 in which said bait-holding device is in the form of an open frame including said elongated member and a pair of spaced apart and opposed bait-engaging prongs secured to said elongated member by respective side arms.

4. An animal trap as claimed in claim 3 in which said inner end of said retaining arm is forwardly deformed through an angle of approximately ninety degrees.

5. An animal trap as claimed in claim 1 in which said spring means comprises two said helically wound springs having loops encompassing opposite side arms of said ground-engaging frame and for abutting engagement with said elongated spine and respective side arms of said movable frame.

6. An animal trap as claimed in claim 1 in which said ground-engaging frame is formed from a continuous elongated upright strip having a top edge surface, terminally secured to said spine and deformed to provide said side arms and said longitudinal section of said ground-engaging frame and in which said movable frame is formed from a continuous elongated upright strip having an edge undersurface and deformed to provide said side arms and said cross-head of said movable frame, said longitudinal section of said ground-engaging frame and said cross-head of said movable frame having corresponding forwardly convex curved configurations for abutment of said edge undersurface of said cross-head with said top edge surface of said longitudinal section of said ground-engaging frame when said movable frame is disposed in said closed position thereof.

7. An animal trap as claimed in claim 6 in which said side arms of said movable frame are pivotally mounted on said side arms of said ground-engaging frame longitudinally outwardly thereof.

8. An animal trap as claimed in claim 6 in which said retaining arm is integrally formed at said outer end thereof with an essentially closed loop which extends through a generally central opening in said cross-head of said movable frame thereby pivotally to be connected thereto.

9. An animal trap as claimed in claim 6 in which side arms of said movable frame first extend forwardly along respective side arms of said ground-engaging frame when said movable frame is in said closed position thereof and then forwardly and angularly upwardly relative to said side arms of said ground-engaging frame.

* * * * *